Sept. 21, 1948.   W. KIERSTED, JR   2,449,902
FILTRATION
Filed May 22, 1945   2 Sheets-Sheet 1

WYNKOOP KIERSTED JR.
INVENTOR

BY   HIS ATTORNEY

Sept. 21, 1948.　　　W. KIERSTED, JR　　　2,449,902
FILTRATION
Filed May 22, 1945　　　　　　　　　　2 Sheets-Sheet 2
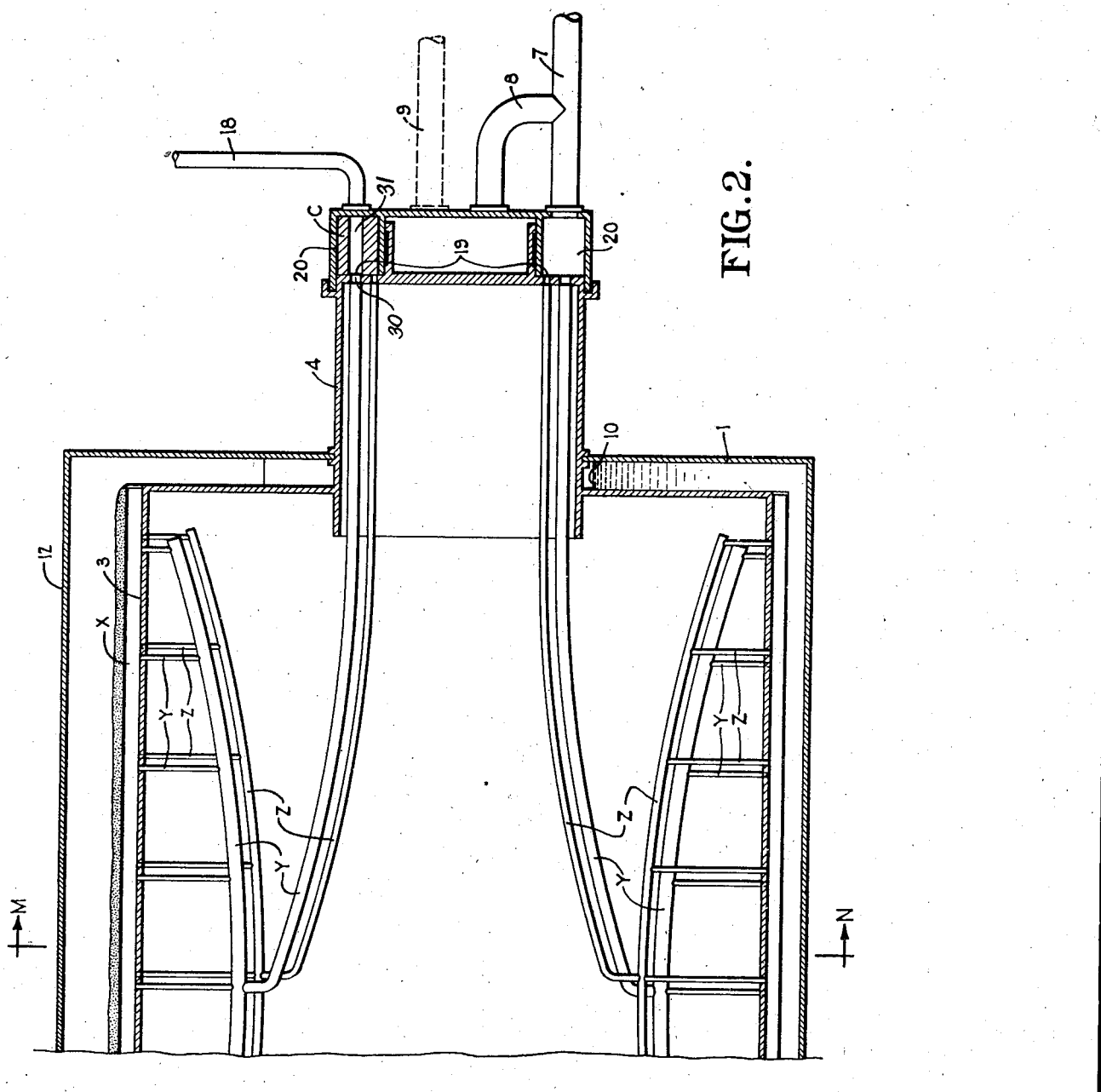
WYNKOOP KIERSTED JR.
INVENTOR
BY　HIS ATTORNEY Patented Sept. 21, 1948

2,449,902

UNITED STATES PATENT OFFICE 2,449,902

FILTRATION

Wynkoop Kiersted, Jr., Scarsdale, N. Y., assignor to The Texas Company, New York, N. Y., a corporation of Delaware Application May 22, 1945, Serial No. 595,164

2 Claims. (Cl. 210—202)

1

This invention relates to filtration and particularly to the separation of solids from a mixture of solids and liquid by continuous filtration.

The invention broadly contemplates a continuous filter operation, such as conducted with a continuous rotary filter apparatus, wherein the interior of the filter element bearing the filter cake is purged of mother liquor intermediate the initial and final application of wash liquid, and then after the final application of wash liquid is again purged to remove residual wash liquid, the gas admitted during the later stage of this final purging being utilized to facilitate discharge of the cake in a substantially dry condition.

A continuous rotary filter useful in practicing the invention may comprise a hollow, rotating cylinder or comprise hollow rotating leaves with means for either creating vacuum within the interior of the filter element or for exerting positive pressure upon the exterior thereof.

A rotary drum filter comprises a cylindrical filtering surface. The filtering surface in turn comprises a plurality of separate, segmental compartments or sections. Each compartment or section is connected by drain pipes to a conventional filter valve.

In operation, the rotating cylinder is partially submerged in the filtering mixture, the submergence being about 40 to 60% of the filtering surface. Solids are deposited on the submerged exterior portion of the filter surface to form a filter cake while liquid flows through the cake and through the filter surface into the interior of the submerged filter compartment from which it is discharged through the drain pipes into the filter valve and from there conducted to a filtrate receiver as primary filtrate.

As the cylinder rotates the filter surface with cake deposited upon it emerges from the filtering mixture. Upon emerging from the filtering mixture, filtration continues coupled with washing of the filter cake so that mother liquor contained in the filter cake is displaced by the wash liquid and is drawn into the interior of the filter compartment, from which it is discharged through the drain pipes and filter valve into suitable filtrate receivers. Washing of the exposed filter cake is effected with a wash liquid or solvent which is usually applied to the exterior of the exposed cake in the form of a spray.

After passage through the washing zone, the filter cake is subjected to drying by the passage through it of gas. Thereafter the cake is removed from the filter surface usually by applying a slight reverse pressure to the interior of the filter element causing distension of the fabric and consequent loosening of the cake. Complete removal of the cake is effected by a suitable deflector blade located adjacent to the exterior surface of the filter fabric.

In large scale filter installations where the filter drum may have a diameter of about 8 to 10 feet the interior of each segmental section or element of the filter including the drain pipes connecting each section with the filter valve will comprise a substantial volume, for example about 1 cubic foot. There may be as many as 30 of these sections or elements. Consequently, as each section emerges from the filtering mixture the interior will be substantially filled with mother liquor which continues to discharge from the drain pipes as the filter section rotates towards the zenith in its path of travel.

As already pointed out, it is customary to apply a spray of wash liquid or solvent over the filter cake after it has emerged from the filtering mixture. In the usual operation, wash liquid is applied to the exterior of the filter cake immediately as it emerges from the filtering mixture for the purpose of effecting a "piston" displacement of mother liquor from the cake into the interior of the filter element. Upon continued rotation of the filter, additional wash liquid is applied to the exterior of the filter cake for the purpose of removing remaining mother liquor retained in the cake.

Re-issue application, S. N. 580,403, which has matured into Reissue 22,646, May 29, 1945, discloses a method for purging the interior of each cake-bearing filter element intermediate the initial and final application of wash liquid. This purging involves admitting gas under relatively low pressure to the interior of the filter element through the drain pipes and the edge of the filter element nearest the zenith in the path of filter element travel, and discharging so-admitted gas together with liquid through the edge of the filter element and drain pipes farthest from the zenith. The purpose of this is to secure a more clean cut separation between primary filtrate and secondary or wash filtrate.

The present invention contemplates as a further feature the admission of low pressure gas through the trailing drain pipes of each washed cake bearing filter element as it approaches the zone of cake removal from the filter surface so as to purge residual wash liquid substantially completely from the interior of the filter element through the leading drain pipes before the filter cake actually reaches the zone of cake discharge.

Then just before the leading edge of the washed cake-bearing element is approximately adjacent the point of cake removal the exit of gas and liquid from the leading drain pipes is blocked. Advantageously, this blocking occurs when the leading edge of the washed cake-bearing filter element is about 6 inches in advance of the tip of the cake discharge blade. This blocking is provided so as to allow sufficient time for pressure to build up in the filter element so as to distend the filter cloth and release the cake just as the leading edge of the filter element reaches th cake discharge blade.

As disclosed in S. N. 580,403, which has matured into Reissue 22,646, May 29, 1945, the leading edge of each filter element is connected by leading drain pipes to the filter valve and likewise the trailing edge of each filter element is connected by trailing drain pipes to the filter valve.

After the initial application of wash liquid to the exterior of the cake-bearing filter element, gas is vented into the element through the drain pipes and edge nearest zenith in its path of rotation, and is discharged therefrom through the edge and connecting drain pipes farthest from zenith, the arrangement being such that the primary filtrate produced consists essentially of mother liquor while the secondary filtrate produced during the washing consists essentially of wash solvent.

Each washed cake-bearing filter element rotates through a cake drying zone during which admission of gas through the drain pipes advantageously is discontinued. Gas from the exterior of the washed cake is drawn through the filter cake into the interior of the filter element and discharged through the drain pipes and filter valve. This drying effects removal of retained wash solvent liquid from the filter cake.

Then the dried cake-bearing filter element rotates towards and into the zone of cake removal. In the conventional filter operation and just before the leading edge of the dried cake-bearing filter element reaches the cake discharge blade, gas from an exterior source is injected through the filter valve into the interior of the element under sufficient pressure to distend the filter fabric and thus loosen the cake.

In accordance with the present invention, this blow-back is effected by resuming the admission of low pressure gas through the trailing drain pipes to the interior of the element following the cake drying or substantially before the dried cake-bearing filter element reaches the zone of cake discharge. So-admitted gas, together with residual wash liquid, is discharged from the interior of the element through the leading drain pipe to the filter valve. Then when the leading edge of the filter element is at a predetermined distance in advance of the cake discharge blade the outflow of gas and liquid from the leading drain pipes into the filter valve is blocked.

As a result of the washing, the filter cake is substantially saturated with wash liquid. Consequently, during the drying step a substantial amount of wash solvent liquid is drawn into the interior of the filter element and under normal conditions is incompletely drained from the interior of the filter element prior to discharge of the cake. It has been proposed heretofore to flush the cake-bearing filter element prior to cake discharge by admitting gas through a trailing drain pipe so as to force this residual wash liquid from the interior of the element through a leading drain or filtrate pipe. Thereafter the conventional blow-back gas is introduced through the filter valve and filtrate pipes, including the leading drain pipes, into the interior of the filter element.

I have found that in spite of the aforesaid flushing, a substantial residue of wash liquid remains in the leading drain pipes prior to this conventional blow-back. Therefore, with the customary blow-back this residue of liquid in the leading drain pipes is blown back through the drain pipes into the interior of the filter element and to a large extent into the filter cake or on to the filter surface. In this latter case, the wash liquid is carried back into the mixture undergoing filtration, thereby altering its composition.

By the procedure of my invention, the leading drain pipe is blocked at the filter valve just before and during cake discharge so as to prevent the reverse flow of any residual liquid through the drain pipe back into the filter element.

Therefore, an important advantage of the invention resides in the avoidance of rewetting of the cake with displaced solvent liquid. A further advantage resides in the avoidance of dilution of the filter mixture with this residual solvent liquid.

Figure 2 is a sectional view taken along the axis of the filter drum showing the interior of a portion of the filter drum and the filter valve.

Figure 1:
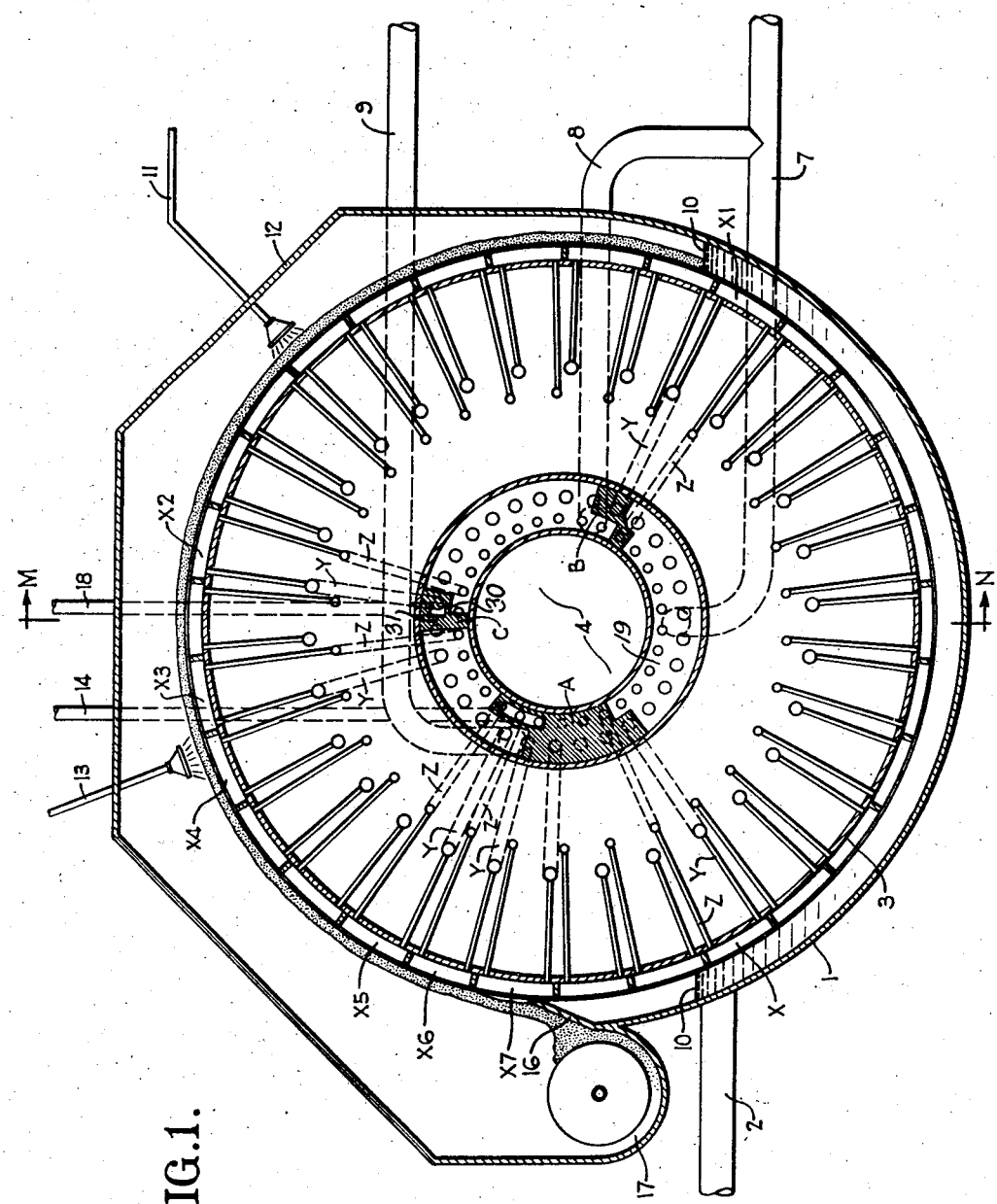
Figure 1 is a diagrammatic sectional view of a rotary drum filter taken along a plane normal to the axis of the drum.

As shown in the figures, the filter comprises a bowl 1 into which the mixture to be filtered is introduced through a pipe 2.

Within the bowl is a horizontal drum 3 rotatably supported by a trunnion 4. The trunnion terminates in the customary filter valve illustrated in the figures.

The cylindrical surface of the drum 3 is surrounded by a filter fabric in the conventional manner. The cylindrical portion of the drum is divided into a plurality of separate segmental sections X about 30 in number. Each of these segmental sections is connected by leading and trailing drain pipes Y and Z respectively to the filter valve on the trunnion 4.

In operation of the filter, filtrate including mother liquor, wash solvent and mixture of mother liquor and wash solvent is drawn through the filter surface into each segmental section and from there through the drain pipes Y and Z to the filter valve from which it is discharged through pipes 7, 8 and 9, as will be described in more detail.

The solids are deposited in the form of a filter cake on the outer surface of the filter fabric while the main stream of mother liquor filtrate is discharged through pipes 7 and 8. As the drum rotates, the filter cake emerges from the filtering mixture, the surface of which may be maintained at a point corresponding to that shown by the numeral 10.

Upon emergence, the filter cake is subjected to washing by a spray 11 of primary wash liquid introduced through a spray extending through the filter shell 12. This wash liquid is forced through the cake to displace the mother liquor contained in the cake and thence into the interior of the filter section to form filtrate relatively rich in mother liquor which is discharged through pipe 8, and is usually merged with the stream of filtrate discharging through pipe 7.

Either before, after, or while the filter cake passes zenith in its path of travel it is subjected to a secondary application of wash liquid through spray 13, the filtrate produced in this zone being discharged through pipe 9.

Upon further rotation, the filter cake is subjected to drying by the passage through it of flue gas or other inert gas, such gas being supplied to the interior of the filter shell by a pipe not shown. Following this the filter cake is discharged. This is accomplished by creating a reverse pressure in the interior of the filter surface by means of gas introduced through a trailing drain pipe, while blocking the outflow from the leading drain pipes. In this way the filter fabric is distended and the cake removed therefrom by means of a knife or scraper 16. The dislodged cake is discharged into a trough 17 of a conveyor.

Referring to Figure 1 and considering the operation of a vacuum filter, it will be seen that as soon as any section X has become completely submerged, drain pipes Y and Z connecting the leading and trailing edges of the section X begin to pass from under block A in the filter valve thus exposing the section X to reduced pressure, which is maintained therein for the purpose of inducing filtration. The vacuum remains unchanged while the section travels to a position just ahead of X1. At that point the ports corresponding to drain pipes Y and Z pass under block B.

The space between blocks A and C (in the direction of drum rotation) is divided by block B so that a different pressure differential may be maintained through the cake in the respective zones. For example, it may be advantageous to maintain a lower pressure differential through the cake in the zone between blocks A and B than in the zone between blocks B and C, in order to prevent building too thick a cake during submergence of the segment. In other words, less vacuum is exerted within the segment during rotation through the zone between blocks A and B. A greater vacuum in the zone between blocks B and C prevents the cake slipping from the drum surface after emergence from the liquid level.

Block B has a width on the inner side equal to slightly more than the diameter of the port corresponding to pipe Z so that immediately after the vacuum between blocks A and B has been cut off from X1 the section is opened to vacuum between blocks B and C through pipe Z.

In this way the drainage of mother liquor from the section into the zone between blocks B and C is conducted through openings on the trailing side of the section by way of pipe Z. As the section emerges from the liquid level, the port corresponding to pipe Y connected with the leading edge of the section emerges into the vacuum zone between blocks B and C.

The drainage of mother liquor continues until block C is reached.

Thus, assuming that the block is in the position located at a point just before zenith, the port 30 in the rotating bearing surface 19 of the filter valve, and which port communicates with pipe Y, as illustrated in Figure 2, passes under block C and opens to a port 31 within this block through which is supplied flue gas under about 5 pounds gauge pressure from a pipe 18. The flue gas then flows through the pipe Y to section X2, across the interior of the section and out through the trailing drain pipe Z into its corresponding port in the inner ring of ports in the filter valve.

The port openings and pipe sizes are advantageously proportioned to afford several complete changes of flue gas through the section and piping while the port of pipe Y is opened to the port in block C in order to purge out all liquid. Block C may have an undercut channel or throttling groove, not shown, so that flue gas may be admitted to pipe Y at a gradually increasing rate before the port of pipe Y actually engages the opening in block C.

The block C may be positioned just beyond zenith in the direction of drum rotation, but in that case, it is necessary to substitute a block of reverse design, that is, one in which the port within the block opens to pipe Z instead of pipe Y. In such case, the gas from pipe 18 enters section X3 through pipe Z and leaves through pipe Y. Accordingly, irrespective of whether the block C is located just before or just after zenith, the gas is admitted through the drain pipe nearest zenith and removed along with liquid through the drain pipe farthest from zenith.

Thus, by providing the block C in the filter valve and introducing a purge gas through the ports therein as above described, the mother liquor is substantially entirely displaced and drained from the emergent filter sections prior to the secondary or further application of the wash liquid, and the mother liquor is substantially entirely removed as primary filtrate through the pipes 7 and 8. The secondary wash liquid is substantially entirely discharged therefrom as secondary or wash filtrate through the pipe 9 and is relatively lean in mother liquor.

The advantage of this arrangement is demonstrated in the case of filtering decolorizing clay from a mixture of clay and oil or from a mixture of clay and color removal solvent. Thus, operating in the conventional manner without the purging step, 1003 gallons per hour of filtrate are drawn off from the space between blocks C and A (in the direction of drum rotation) and 2063 gallons are drawn off as combined liquid from the spaces between blocks A and C. On the other hand, when operating with the purging step the respective volume of liquid drawn off are 364 and 2782 gallons per hour. In other words, with the purging step some 639 gallons of filtrate, consisting mainly of mother liquor are diverted into primary filtrate that would otherwise be discharged as secondary filtrate.

Thus, by means of this purging step washing of the filter cake to displace and remove retained mother liquor is rendered more effective. The secondary filtrate obtained following the purging step contains a relatively small amount of mother liquor and, therefore, can be recycled in a conventional filtering operation as a diluent for the initial feed mixture to the filter. Where the purging step is omitted, the secondary filtrate is richer in oil and instead of recycling it, it is necessary to subject it to a fractional distillation in order to separate wash liquid or solvent from mother liquor or from solute.

However, where the purging step is practiced, it is unnecessary to subject the secondary filtrate to the recovery operation thereby materially reducing the cost of the filtering operation. In fact, the resulting reduction in cost is sufficient to actually permit the application of a larger volume of wash liquid in the secondary washing step and thereby permit of economically subjecting the filter cake to additional washing.

When the filter section reaches the position X4 it is subjected to the application of additional wash liquid applied through the spray pipe 13, during which time both the leading and trailing drain pipes from the section are open to the filter valve ports so that drainage occurs through both pipes towards the filter valve. The wash liquid draining into the filter valve during rotation of the filter element through this secondary washing zone comprises secondary filtrate and is discharged from the filter valve through a pipe 9. It is contemplated that this secondary filtrate will consist essentially of wash solvent liquid.

As a result of continued rotation, the filter section reaches a position X5 wherein it is in the drying zone. During passage through the drying zone, gas is drawn from the filter hood through the filter cake into the interior of the filter section. From here it is drawn through both leading and trailing drain pipes into the filter valve and discharged through the pipe 9.

The cake-bearing filter section undergoing drying continues to move towards the zone of cake discharge reaching the position X6. As it does so the port corresponding to the trailing drain pipe Z passes under the extended portion of the filter block A. This extended portion is provided with a port communicating with pipe 14, through which low pressure gas, similar to that in the pipe 18, is supplied.

Thus when the port corresponding to the pipe Z passes under this portion of the block A and opens to the low pressure gas from pipe 14, this low pressure gas flows into the pipe Z and therethrough into the interior of the filter section. It passes across the interior of the filter section and out through the leading drain pipe Y and from there into its corresponding port in the outer ring of ports in the filter valve. From there it is discharged through the pipe 9. As the filter section undergoes further rotation into the position X7 the port corresponding to the leading drain pipe Y passes under the block A so that the outflow of fluid from the leading drain pipe into the filter valve is blocked. As previously mentioned, this advantageously occurs when the leading edge of the filter section is about 6 inches in advance of the cake discharge blade 16. However, the port corresponding to the trailing drain pipe Z is still in communication with the port in the block A so that gas continues to be admitted from the pipe 14, thereby creating sufficient pressure within the filter section so that it is distended, thereby loosening the cake as it comes into contact with the cake discharge blade 16.

Numeral 19 in Figure 2 designates the rotating bearing surface of the filter valve adjacent the end of the trunnion 4 and in which surface terminate the drain pipes Z and Y, affording communication with the aforementioned segmental sections X of the filter surface. Numeral 20 designates a channel in the filter valve into which the blocks A, B and C are rigidly attached to the filter valve. These blocks are removable and are so formed as to provide a snug fit and thus completely block the channel 20 at the point of their location.

As already described, the trunnion 4 rotates with the filter drum, while the filter valve remains stationary. Therefore, since the blocks A, B and C are rigidly attached to the filter valve the moving surface 19 of the trunnion 4 slides over the blocks. The surface 19 is advantageously of brass while the blocks are formed of steel and in this way a slidable, substantially leakproof joint is provided between the trunnion 4 and the blocks of the filter valve.

It is contemplated that the position of the filter blocks relative to each other and to the filter valve channel may be adjusted depending upon the particular type of filtering operation being practiced.

The absolute pressure in the filter valve during the purging which occurs intermediate the initial and final application of wash liquid is approximately 18 pounds per square inch absolute. The pressure in the interior of the filter section being purged is approximately 10 pounds per square inch gauge. The pressure in the vacuum compartment of the filter valve to which the liquid is being discharged is approximately 3 pounds per square inch absolute, and the pressure in the filter hood is approximately 15 pounds per square inch absolute at all times.

Approximately these same pressures prevail throughout the cake drying portion of the cycle. The admission of purge gas usually does not continue throughout the cake-drying zone. In any case, the introduction of gas for purging after the initial application of wash liquid is of very short duration, for example approximately equivalent to the length of time required for the drum surface to travel the width of the filter section which in turn is usually about $\frac{1}{30}$ of the drum circumference. The introduction of purge gas during the cake drying step may extend over a time approximately equivalent to that required for the drum surface to travel a distance equal to one half the width of a filter section, or about $\frac{1}{60}$ of the drum circumference.

The invention is applicable to the separation of solidifiable constituents from fatty acids, fatty oils and the like. It is useful in the separation of wax from mineral or other hydrocarbon oils.

The primary and secondary applications of wash may in reality be one extended application of wash which continues over the filter section being subjected to purging. In other words, a section is at no time completely void of liquid since it is obvious from the specific pressure conditions previously set forth that liquid is being drawn into the section from the cake at all times when the pressure in the section is less than the external pressure in the hood.

Obviously many modifications and variations of the invention as hereinbefore set forth may be made without departing from the spirit and scope thereof, and therefore only such limitations should be imposed as are indicated in the appended claims.

I claim:

1. In the continuous filtration of solids from a mixture of solids and mother liquor by means of a continuous rotary drum filter, the filter drum comprising a plurality of hollow segmental filter sections whose leading and trailing edges are in fluid communication through leading and trailing drain pipes with a filter valve, wherein the drum is continuously rotated so that each filter section submerges within and then emerges from the filtering mixture, a filter cake of solids is formed upon the exterior of each section and filtrate is forced through the cake into the interior of each section and is discharged therefrom through said drain pipes and filter valve, the filter cake during rotation of the filter section after emerging from the filter mixture is subjected to washing by passing a wash liquid therethrough and to drying by passing gas therethrough during application of suction from the filter valve through said drain pipes, and upon further rotation moves into a zone of cake removal, the steps comprising admitting gas under low pressure to the interior of said section through its trailing drain pipe following said drying and during its advance toward the zone of cake removal, discharging so admitted gas through the leading drain pipe, said gas displacing remaining filtrate through said leading drain pipe toward the filter valve, subsequently and while still prior to removing the cake from the surface, closing the filter valve outlet of said leading drain pipe while continuing the admission of said gas through said trailing drain pipe to thereby create a back pressure within the filter section to distend the filter surface and facilitate removal of the cake from the distended surface without reversing the direction of fluid flow within the leading drain pipe during the building up of said back pressure such that residual liquid remaining in said leading drain pipe is prevented from returning to and through the filter cloth into the cake and removing the cake from the filter surface.

2. In the continuous filtration of solids from a mixture of solids and mother liquid by means of a continuous rotary drum filter, the filter drum comprising a plurality of hollow segmental filter sections whose leading and trailing edges are in fluid communication through leading and trailing drain pipes with a filter valve, wherein the drum is continuously rotated so that each filter section submerges within and then emerges from the filtering mixture, a filter cake of solids is formed upon the exterior of each section, and filtrate is forced through the cake into the interior of each section and is discharged therefrom through said drain pipes and filter valve, the filter cake during rotation of the filter section after emerging from the filter mixture is subjected to washing by passing a wash liquid therethrough and to drying by passing gas therethrough during application of suction from the filter valve through said drain pipes, and upon further rotation moves into a zone of cake removal, the steps comprising admitting gas under low pressure to the interior of said section through its trailing drain pipe following said drying and during its advance toward the zone of cake removal, discharging so admitted gas through the leading drain pipe toward the filter valve, subsequently and while still prior to removing the cake from the surface, closing the filter valve outlet of said leading drain pipe when the leading edge of the cake bearing section is about 6 inches in advance of the point of removing the cake therefrom, continuing the admission of said gas through said trailing drain pipe after said closing to create thereby a back pressure within the filter section sufficient to distend the filter surface and facilitate removal of the cake from the distended surface without reversing the direction of fluid flow within the leading drain pipe during the building up of said back pressure, and removing the cake from the filter surface.

WYNKOOP KIERSTED, JR.

REFERENCES CITED

The following references are of record in the file of this patent:

UNITED STATES PATENTS

| Number | Name | Date |
|---|---|---|
| Re. 22,646 | Kiersted, Jr. | May 29, 1945 |
| 1,593,051 | Woodworth | July 20, 1926 |
| 2,186,289 | Gee | Jan. 9, 1940 |
| 2,348,822 | Kiersted, Jr. | May 16, 1944 |
| 2,352,303 | Young | June 27, 1944 |
| 2,352,304 | Young | June 27, 1944 |
| 2,362,300 | Nyman | Nov. 7, 1944 |